(12) United States Patent　(10) Patent No.: US 9,305,148 B2
Rhoads　(45) Date of Patent: *Apr. 5, 2016

(54) ECONOMICALLY SECURE DIGITAL MASS MEDIA SYSTEMS

(71) Applicant: Digimarc Corporation, Beaverton, OR (US)

(72) Inventor: Geoffrey B. Rhoads, West Linn, OR (US)

(73) Assignee: Digimarc Corporation, Beaverton, OR (US)

( * ) Notice: Subject to any disclaimer, the term of this patent is extended or adjusted under 35 U.S.C. 154(b) by 176 days.

This patent is subject to a terminal disclaimer.

(21) Appl. No.: 14/193,968

(22) Filed: Feb. 28, 2014

(65) Prior Publication Data

US 2014/0344574 A1　Nov. 20, 2014

Related U.S. Application Data

(63) Continuation of application No. 10/861,317, filed on Jun. 3, 2004, now Pat. No. 8,667,275.

(51) Int. Cl.
*G06F 21/16*　(2013.01)
*G11B 20/00*　(2006.01)
*G11B 20/18*　(2006.01)

(52) U.S. Cl.
CPC .......... *G06F 21/16* (2013.01); *G11B 20/00086* (2013.01); *G11B 20/18* (2013.01)

(58) Field of Classification Search
CPC ... G06F 21/16; G11B 20/00086; G11B 20/18
USPC .............................. 726/26; 713/167, 176, 182
See application file for complete search history.

(56) References Cited

U.S. PATENT DOCUMENTS

| 6,145,081 | A | 11/2000 | Winograd et al. |
| 6,611,607 | B1 | 8/2003 | Davis et al. |
| 6,614,914 | B1 | 9/2003 | Rhoads et al. |
| 6,728,390 | B2 | 4/2004 | Rhoads et al. |
| 6,801,999 | B1 | 10/2004 | Venkatesan et al. |
| 6,807,285 | B1 | 10/2004 | Iwamura |

(Continued)

OTHER PUBLICATIONS

Watermark-based Copyright Protection System Security, by Sai Ho Kwok, Communications of the ACM, vol. 46, Issue 10 (Oct. 2003) pp. 98-101.

(Continued)

*Primary Examiner* — Kambiz Zand
*Assistant Examiner* — Benjamin Kaplan
(74) *Attorney, Agent, or Firm* — Digimarc Corporation

(57) ABSTRACT

Content is encoded with a watermark that associates it with a particular consumer. When presented for playback, the rendering equipment examines the watermark to confirm that the consumer with whom the content is associated, is also the consumer with whom the equipment is associated. If there is no watermark—or if the watermark is associated with a different consumer, then playback is refused. The equipment also desirably checks whether the content has a second watermark (or even a very feeble remnant thereof), indicating that the content has been derived from content earlier provided to a different consumer. If so, playback is again refused. Thus, this embodiment will refuse to play if there is no watermark; if there is one watermark not associated with the proprietor of the equipment; or if there are two or more watermarks.

13 Claims, 2 Drawing Sheets

(56) References Cited

U.S. PATENT DOCUMENTS

| | | |
|---|---|---|
| 6,850,626 B2 | 2/2005 | Rhoads et al. |
| 6,868,497 B1 | 3/2005 | Levy |
| 6,931,536 B2 | 8/2005 | Hollar |
| 6,954,541 B2 | 10/2005 | Fan et al. |
| 6,961,854 B2 | 11/2005 | Serret-Avila et al. |
| 6,975,744 B2 | 12/2005 | Sharma et al. |
| 6,986,048 B1 | 1/2006 | Epstein et al. |
| 7,062,067 B2 | 6/2006 | Braudaway et al. |
| 7,095,874 B2 | 8/2006 | Moskowitz et al. |
| 7,107,451 B2 | 9/2006 | Moskowitz |
| 7,158,652 B2 | 1/2007 | Iwamura |
| 7,266,217 B2 | 9/2007 | Rhoads et al. |
| 7,366,907 B1 | 4/2008 | Ezaki |
| 7,561,715 B2 | 7/2009 | Talstra et al. |
| 2001/0037313 A1 | 11/2001 | Lofgren et al. |
| 2002/0061121 A1 | 5/2002 | Rhoads et al. |
| 2002/0095577 A1 | 7/2002 | Nakamura et al. |
| 2002/0178368 A1 | 11/2002 | Yin et al. |
| 2002/0186844 A1 | 12/2002 | Levy et al. |
| 2002/0191809 A1 | 12/2002 | Kirovski et al. |
| 2003/0076955 A1 | 4/2003 | Alve et al. |
| 2003/0133589 A1 | 7/2003 | Deguillaume et al. |
| 2003/0138127 A1 | 7/2003 | Miller et al. |
| 2004/0001607 A1 | 1/2004 | Hwang et al. |
| 2004/0042635 A1 | 3/2004 | Epstein et al. |
| 2004/0243634 A1 | 12/2004 | Levy |
| 2005/0132196 A1 | 6/2005 | Dietl |
| 2005/0204037 A1 | 9/2005 | Levy |
| 2006/0075244 A1 | 4/2006 | Schumann et al. |

OTHER PUBLICATIONS

PCT/US2005/019503, Preliminary Report on Patentability, dated Sep. 7, 2007, 5 pages.

Adelsbach et al, "Watermark Detection With Zero-Knowledge Disclosure," Multimedia Systems, vol. 9, No. 3, pp. 266-278, Sep. 2003.

Craver et al., "Can Invisible Watermarks Reslove Rightful Ownerships?" IBM Technical Report RC 20509, Jul. 25, 1996, pp. 1-21.

Hartung et al, "Fast Public-Key Watermarking of Compressed Video," proc. IEEE Int'l Conf. on Speech and Signal Processing, pp. 528-531, 1997.

Swanson et al., "Multiresolution Scene-Based Video Watermarking Using Perceptual Models," IEEE Journal on Selected Areas in Communications, May 1998, vol. 16, No. 4, pp. 540-550.

Swanson et al., "Robust Audio Watermarking Using Perceptual Masking," Signal Processing, vol. 66, No. 3, pp. 337-355, 1998.

Zhao, "Digital Watermark Mobile Agents," Proc. of NISSC'99, Arlington, VA, Oct. 18-21, 1999, pp. 138-146.

ECONOMICALLY SECURE DIGITAL MASS MEDIA SYSTEMS

RELATED APPLICATION DATA

This application is a continuation of application Ser. No. 10/861,317, filed Jun. 3, 2004 (now U.S. Pat. No. 8,667,275).

FIELD OF THE INVENTION

The present invention relates to the electronic distribution and use of content, and more particularly relates to technologies that combat unauthorized distribution and/or use of content.

BACKGROUND AND SUMMARY OF THE INVENTION

Much time and expense has been invested in technologies that secure content against unauthorized distribution and use, especially with regards to global-scale media distribution systems supporting ~trillions of individual content copies and ~billions of rendering devices. These prior art technologies commonly involve encrypting the content, so that only users licensed to access the content can do so.

Although many of these protection technologies are sophisticated, they suffer from a fundamental flaw: the content cannot be secured always. To have any value, it must eventually be rendered for presentation to a human consumer (e.g., displayed on a screen for viewing; converted into sound for listening, etc.). When the content is rendered, it can be electronically re-captured (e.g., using a microphone, or more generally, digitally capturing uncompressed/unencrypted signals as they journey toward speakers or display screens, or to the user). The person who re-captures the content can then re-distribute it. Thus, perfect protection is unattainable.

(There are very limited cases where re-capturing may be prevented, e.g., in controllable rendering environments, such as cinema auditoriums or high security briefing rooms. And there are a variety of cases in which re-capturing is not objected-to, or may be desired. These are not the focus of the present work.)

Once a person has re-captured content, there are myriad options for its re-distribution. Free distribution, e.g., on peer-to-peer networks or bulletin board/warez download sites, is one possibility. Another is for the pirate to commercially re-distribute the content—using protection techniques of the sort that were initially applied to the content, e.g., encryption and/or sophisticated digital rights management technologies. This presents the ironic dilemma of advances in protection technologies being turned against lawful copyright proprietors.

Of course, the pirate may simply keep the re-captured content for his own subsequent use.

Given the ultimate futility of content protection, the best that may be done—at a most fundamental level—is to have the rendered content convey a substantially unerasable identity, e.g., using a digital watermark. Better still, it would be ideal if this identity could somehow be integral in the initial rendering of the content in the first place, as well as becoming an economically debilitating impediment to any pirate attempting to utilize legitimate global-scale distribution systems for redistributing the otherwise copy-able content.

Although different types of watermarks can be employed for this identification purpose, one attractive option is to use asymmetrical digital watermarks. These are marks from which a decoder can extract information, without knowledge of how the content was originally encoded. Such marks are appealing because the absence of knowledge about encoding prevents calculated attacks seeking to precisely counteract the mark. Instead, attacks on such marks are generally limited to trying to drown out the watermark signal, e.g., by applying high levels of noise, distortion or such general mischief. These types of attacks inevitably impair the quality of the underlying content, comprising its commercial value. The beauty behind the general notion of asymmetrical digital watermarking is that such attacks never truly erase the watermark, they merely attempt to interfere in some particular instance or class of identification procedure.

Herein lies a fundamental flaw in such "functional erasure" attacks, in that they are not future-proof. Said another way, time is on the side of engineers who can design better and better methods of detecting traces of residual asymmetric watermarks, as opposed to copyright-pirates who attempt to erase traces of such watermarks under the constraint of not thoroughly degrading the value of the copied content.

While identification marking of content is a useful component of a layered security system, it will not—alone—prevent a pirate from profiting from his piracy. To do this, the watermark should also play a role (or multiple roles) in consumption of the content.

In accordance with one particular embodiment of the present invention, electronic content is encoded with a watermark associating it with a particular consumer. When presented for playback, the rendering equipment examines the watermark to confirm that the consumer with whom the content is associated, is also the consumer with whom the equipment is associated. If there is no watermark—or if the watermark is associated with a different consumer, then playback is refused.

The equipment also desirably checks the content for tell-tale signs of piracy. In one arrangement, the equipment checks to see if the content has a second watermark (or even a very feeble remnant thereof), indicating that the content has been derived from content earlier provided to a different consumer. If such a check proves positive, playback is again refused. (As considered below, a pirate's attempt to conceal or remove this earlier watermark is unlikely to succeed.)

Thus, this illustrative rendering equipment will refuse to play if there is no watermark; if there is one watermark not associated with the proprietor of the equipment; or if there are two or more watermarks.

It will be recognized that the foregoing arrangement addresses the problem of content re-capture and re-distribution. If content is re-captured from user A and re-distributed to user B, user B's rendering device(s) will refuse to play. Either the re-Distributor will not have added a watermark associating the content with user B—leading the rendering device to discover that such content is not intended for user B; or the re-Distributor will have added such a watermark—and the rendering device will refuse playback because it finds two watermarks. (Certain embodiments of the invention permit a legitimate purchaser to physically bring their copy of content to a friend's house and play it there; it is only when a copy of the content is transferred to the friend's system without involvement of the copy's intended proprietor that playback is foiled.)

As a pragmatic matter, consumers, content producers and infrastructure vendors will not gravitate toward adopting a new media distribution system simply because it eliminates mass-scale piracy; a new media system must fundamentally provide new benefits to all three constituencies in the media marketplace. Arrangements detailed herein provide benefits for each constituent and all three as a group, thereby addressing the otherwise daunting problem of non-compliant legacy media players and "rogue players." Both of these latter apparent piracy avenues can be rendered economically unattractive to pirates and the media consumers alike, and thus relegate both to the same fringes of consumers and providers that typified the 1970s-era bootleg tape culture.

The foregoing is just one of many forms of the invention, and is subject to numerous novel variations. Other arrangements are disclosed in the detailed description, which proceeds with reference to the accompanying drawings.

DETAILED DESCRIPTION

Figure 1:
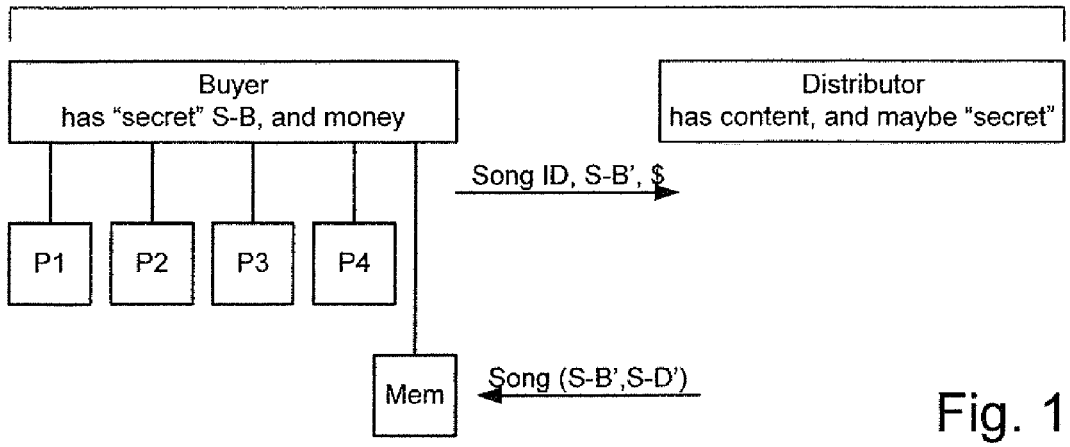
FIG. 1 illustrates an embodiment according to one aspect of the present invention.

Referring to FIG. 1, consider the case of a Buyer who wishes to download a song from a content Distributor.

Buyer has a "secret" S-B, which may comprise personal information of a sort that he or she does not want widely disseminated. Examples include credit card number, social security number, telephone number, bank account number, private cryptographic key, fingerprint, retinal scan, etc. (Secrecy, per se, is not required.) Buyer also has a means for exchanging value, such as digital cash, credit account, etc. Associated with Buyer are various media devices (P1-P4), e.g., a portable music player, a home stereo, a car stereo, a computer media player, etc.

Distributor has content desired by Buyer. (Optionally, Distributor may have its own "secret," S-D, with secrecy per se not required.)

In a first part of an illustrative transaction, Buyer contacts Distributor and identifies desired content, e.g., by a song ID. Buyer also provides to Distributor—either now or previously, derivative information S-B' based on Buyer's secret. Buyer can also provide any requisite payment ('$').

(The derivative information S-B' can take myriad forms. It can be Buyer's secret S-B without alteration. Alternatively, it can be data that is derived from, or processed using, Buyer's secret S-B. Thus, for example, S-B' may be a hash of S-B. Or S-B' may be S-B encrypted by Buyer's private key of a public-private key pair. Or S-B' may be the secret S-B after encryption by a key known to both Buyer and Distributor. Or S-B' may be the secret S-B combined with, and/or processed by, other data, possibly hashed and/or encrypted. Etc., etc.)

Figure 2:
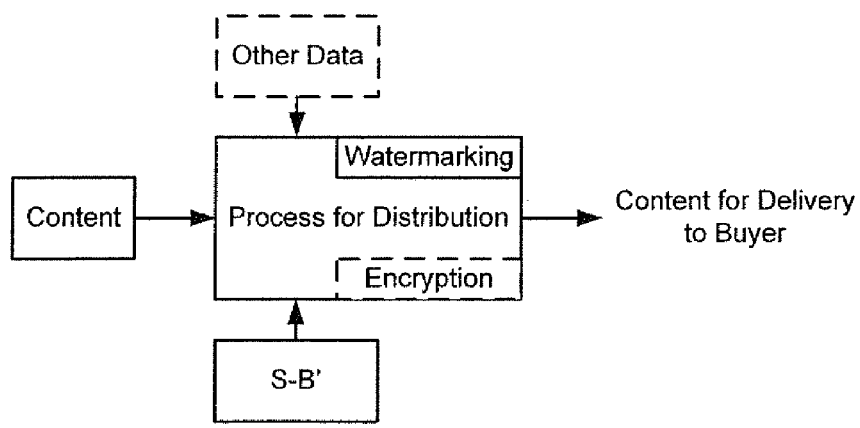
FIG. 2 illustrates elements of a sample process for preparing content for delivery to a buyer.

After receiving information from Buyer, Distributor responds by preparing the desired song for delivery to Buyer (FIG. 2). This processing includes encoding with a watermark—preferably but not necessarily an asymmetric watermark. This watermark can be based on Buyer's derivative information S-B'. (Optionally, it may also be based on derivative information S-D' derived from a Distributor's secret.) After preparation, the encoded song is transmitted to Buyer.

When received by Buyer, this data is stored in a memory (either centralized, or in one or more of the devices P) for later use, or streamed directly to a playback device.

Desirably, each playback device P has one or more users, U1, U2, etc., associated with it (e.g., members of a family). These are the persons whose secured content is authorized for playback using such device. This association can be effected by providing each device with the secrets of authorized users. The device can have a small memory in which their respective secrets S-U1, S-U2, etc., are stored. (Just as discussed above, derivative information S-U1', S-U2', can be derived from, or processed using, these secrets S-U1, S-U2, etc.)

Playback (or other use) of the content on a device is permitted only when the content has been prepared by the Distributor for delivery to one of the device's authorized users. Thus, at the commencement of (and/or during) playback, the device checks to confirm that the content bears evidence of association with one of its authorized users.

One way that the device may check this association is by determining whether any of the authorized users' derivative information (S-U1', S-U2', etc.) is consistent with the processed song data.

For example, the device may decode the watermark earlier encoded in the song, and obtain from the watermark payload Buyer's derivative information S-B'. It then checks whether derivative information S-U1', S-U2', etc., corresponding to any of the device's authorized users, matches S-B'. If so, playback continues. If not, it is interrupted.

In the example just-given, it is assumed that the content preparation performed by Distributor included embedding S-B' as part of the watermark payload. However, this need not be the case. For example, rather than include S-B' as part of the payload, Distributor may have instead used S-B' in another manner.

In one such arrangement, Distributor may have used S-B' as a watermark key sequence (or carrier) that defined, e.g., how, or where, other information was embedded in the content. In this case, the playback device conducts its check by applying derivative information S-U1', S-U2', etc., as decoding key sequence information, to try and decode the watermark from the content. If a correct read results (e.g., as determined by checksum or ECC data), then playback continues. If the watermark cannot be correctly read using derivative information from any of the stored authorized user secrets, then playback is disabled.

In another such arrangement, Distributor may have used S-B' as an encryption key for some or all of the content. In this case, the playback device conducts its check by trying to decrypt the content with S-U1', S-U2', etc., until a valid data stream is decrypted, or until derivative information for each of the authorized users has been tried and failed. In the former case playback is authorized; in the latter it is disabled.

(Other such arrangements are possible; the foregoing are just exemplary.)

In these and other arrangements, the watermark in the content may convey information needed to obtain access to the content from its distributed form. For example, Distributor may package and distribute the song as a series of separately encrypted excerpts. The first excerpt may be ten seconds of song "in the clear" (or encrypted with S-B'), and may be watermarked to convey a first decryption key. The second excerpt may be ten seconds of song encrypted with this first decryption key. If the playback device does not successfully decode the watermark from the first ten seconds of song, the next ten seconds of song will be inaccessible. Likewise, after decryption, the watermark in the second except of song conveys a decryption key for the next segment of song, etc. Thus, rendering this content depends on a series of successful watermark decodes.

A variety of other usage scenarios can be dealt with in straightforward manners. Consider, for example, the case where a Buyer wishes to start rendering of a video at a mid-point, rather than the beginning. In the system just-described, content at the mid-point is encrypted using a key that is available only by watermark decoding of a previous excerpt.

Such dilemma can be redressed by partial decoding capability, with gradual build-up of decryption keys over a frame, e.g., permitting delivery of full quality content over a span of, e.g., 15 video frames.

Further consider the case where Buyer wishes to play the earlier-obtained song at a friend's house. The song can be transferred by email, by network transmission, by media, etc. Normally, a friend's device would refuse to play the song, since it bears a watermark associating it with a different consumer. However, Buyer may provide the friend's device with his secret S-B (or S-B'), permitting playback. (Entry can be by any suitable means, e.g., keyboard, storage medium, fingerprint scanner, etc.) The person entering the information can specify how extensively the secret can be used to authorize content playback. For example, the person entering the information may authorize its use only once, or N times (e.g., 3, 10, user-specified, etc.), or only through midnight tonight, or for a week, or until another secret is entered, or permanently, etc.

Figure 3:
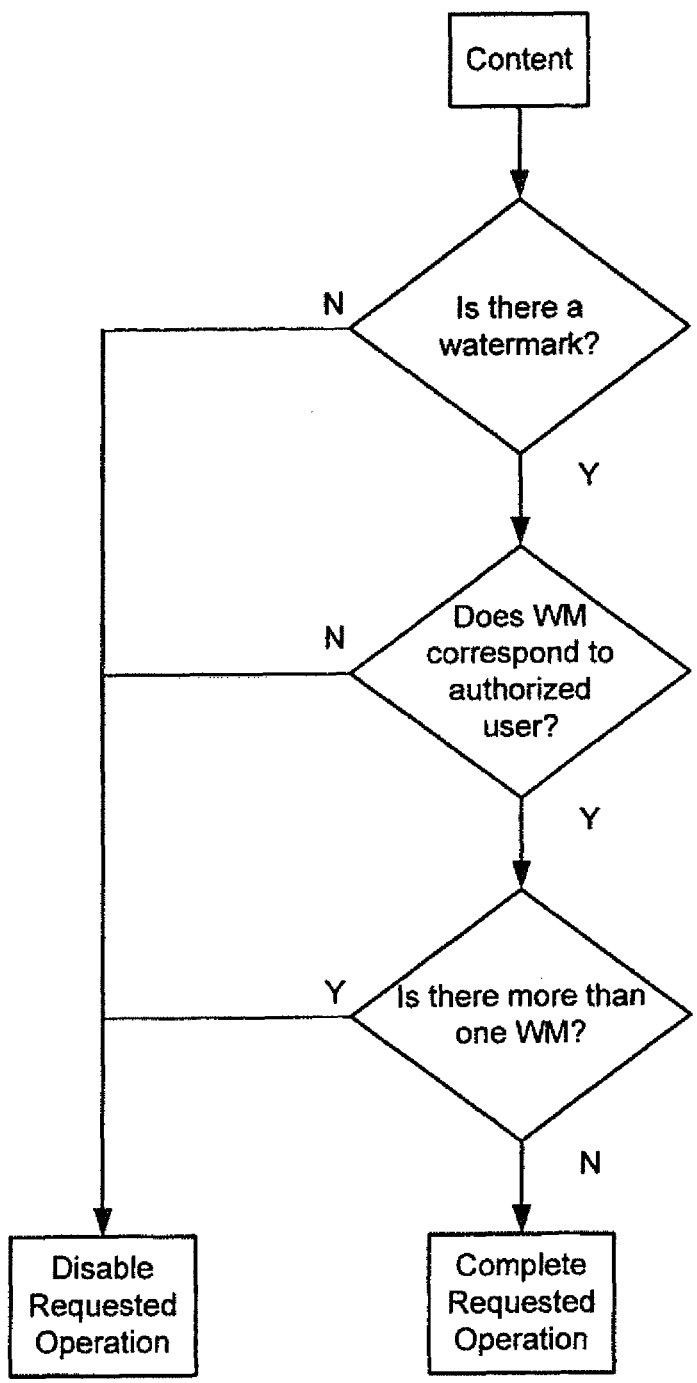
FIG. 3 illustrates elements of a sample playback process.

As noted, certain embodiments check for tell-tale signs of a previous watermark, and disable content playback if found (FIG. 3). For an asymmetric watermark, removal is not generally possible, since information available by analysis of the marked content or the decoder is not sufficient to characterize the watermark for removal. Accordingly, if asymmetric watermark technology is used, a pirate's only hope is to swamp the mark with noise—degrading the commercial value of the content. Even if an asymmetric watermark is not used, the expense of perfect watermark removal—in terms of time and effort spent reverse engineering and re-processing—makes this attack generally unappealing. Moreover, the state of watermark detection is now sufficiently advanced that essentially any remnant of an attacked watermark can be discerned—especially given the processing power of modern devices, and the fact that watermark detection can proceed across the span of several seconds or minutes. Thus, even if a pirate reduced the ratio of energy in the sought-to-be-removed watermark to the pirate-added watermark to 0.01, or even 0.001, the former watermark could generally still be detected, and playback disabled.

It was earlier noted that content may be delivered as a collection of excerpts. This is a concept whose applicability extends beyond the embodiments detailed herein. Any content may be treated in this fashion. TCI/IP packeting is one approach, but others can naturally be used.

Given the Babel of media formats, it would be desirable for a common standard to emerge by which content of any type or form could be represented—audio, video, office documents, etc. Such a standard would provide flexibility so that the content could be encrypted, if desired, using any encryption algorithm or protocol. Likewise, it would permit the content to be represented in any compressed form. Watermarking, too, would be globally permitted. The standard would be agnostic as to all such variations. Call it XGMF: extremely generic media format. It may comprise packets of tens of bytes to thousands of bytes. Through the techniques detailed above, each packet is somehow a function of Buyer's secret S-B, and will thus be recognized as content that can be rendered using any of Buyer's devices P1, P2, etc.

Adoption of such a generalized content format would enable content commerce to flourish—unhampered by the incompatibilities that now plague the marketplace.

Having described and illustrated principles of my inventive work with reference to a variety of embodiments, it will be recognized that the invention is not so limited.

For example, while examples were given in the context of content playback, other uses of content can be similarly managed and/or controlled. These include recording, editing, printing, saving, copying, forwarding, etc.

Likewise, although the foregoing examples focused on audio content, the same principles are likewise applicable to other forms of content, including still imagery, video, office documents, 3D models, virtual reality experiences, etc.

In the foregoing arrangements, it was assumed that any information conveyed as watermark payload data was "in the clear." In other embodiments, this need not be the case. For example, some or all of the information in any watermark payload may be encrypted. The encryption key may be a secret key shared by Buyer and Distributor. Or it may be S-B, S-B', S-D, S-D', the private key of Distributor's public/private key pair, etc.

Many arrangements can benefit by use of digital signature technology. For example, such technology can advantageously be combined with the other arrangements detailed herein to authenticate or render non-repudiable content sent from a particular distributor, or leaked from a particular buyer.

In some embodiments, the financial consideration provided by the Buyer to the Distributor is electronic fund data that is derived from the Buyer's secret S-B, thus associating the funds with Buyer. In some arrangements, Buyer's derivative information S-B' need not be transmitted to the Distributor. In one such case, Distributor determines S-B' from the electronic fund data. In another, the electronic fund data is sufficiently unique to Buyer (e.g., a credit card number) that it is used in preparation of the content by Distributor and provided to Buyer, in a manner akin to the use of S-B' detailed earlier.

Asymmetrical watermarking systems (sometimes referred to as zero knowledge watermarking systems, or public-key watermarking systems) have been the subject of extensive academic discussion, and so are not belabored here. The reader is presumed to be skilled in such technology, and be able to employ such technology—and subsequent improvements thereto—in the contexts detailed herein. For those unfamiliar with the subject, the following references provide an introduction:

Adelsbach et al, "Advanced Techniques for Dispute Resolving and Authorship Proofs on Digital Works," SPIE vol. 5020, pp. 677-688, 2003.

Adelsbach et al, "Watermark Detection With Zero-Knowledge Disclosure," Multimedia Systems, vol. 9, no. 3, p. 266-278, Sep. 2003.

Choi et al, "Transformed-Key Asymmetric Watermarking System," SPIE vol. 4314, pp. 280-289, Jan. 2001.

Craver et al, "An Implementation of, and Attacks on, Zero-Knowledge Watermarking," 6th Intl Workshop on Information Hiding, May 23, 2004.

Craver et al, "Copyright Protection Protocols Based On Asymmetric Watermarking—The Ticket Concept," Communications and Multimedia Security Issues of the New Century. IFIP TC6/TC11 Fifth Joint Working Conference on Communications and Multimedia Security (CSM'01), pp. 159-170, May, 2001.

Craver et al, "Security Analysis of Public Key Watermarking Schemes," Proc. SPIE, vol. 4475, pp. 172-182, Jul. 2001.

Craver et al, "Zero Knowledge Watermarking," in Information Hiding III, Springer Lecture Notes in Computer Science, v. 1768, pp. 101-116 (2000).

Eggers et al, Public Key Watermarking By Eigenvectors Of Linear Transforms," EUSIPCO 2000.

Furon et al, "An Asymmetric Watermarking Method," IEEE Trans. on Signal Processing, vol. 51, no. 4, pp. 981-995, Apr. 2003.

Furon et al, "An Unified Approach of Asymmetric Watermarking Schemes," SPIE vol. 4314, pp. 269-279, Jan. 2001.

Furon et al, "Robustness of Asymmetric Watermarking Technique," Proc. 2000 Int'l Conf. on Image Processing, vol. 3, pp. 21-24, Sep., 2000.

Furukawa, "Secure Detection of Watermarks," IEICE Transactions on Fundamentals of Electronics, Communications and Computer Sciences, vol.E87-A, no. 1, pp. 212-220, Jan. 2004.

Hachez et al, "Which Directions for Asymmetric Watermarking?" Proc. of EUSIPCO, Sep. b 2002.

Hartung et al, "Fast Public-Key Watermarking of Compressed Video," proc. IEEE Int'l Conf. on Speech and Signal Processing, pp. 528-531, 1997.

Hyuk et al, "Transformed-Key Asymmetric Watermarking System," IEEE Signal Processing Letters, vol. 11, no. 2, pt. 2, p. 251-4, Feb. 2004.

Liu et al, "Secure Watermark Verification Scheme," Proc. Third IEEE Pacific Rim Conference on Multimedia, (Springer Verlag Lecture Notes in Computer Science vol. 2532), p. 477-484, Dec. 2002.

Tae et al, "An Asymmetric Watermarking System With Many Embedding Watermarks Corresponding To One Detection Watermark," IEEE Signal Processing Letters, vol. 11, no. 3, pp. 375-377, Mar. 2004.

Tae et al, "Correlation-Based Asymmetric Watermark Detector," Proc. Int'l Conf. on Information Technology: Coding and Computing, pp. 564-568, Apr. 2003.

Tae et al, "Generation of Embedding Watermark Signals From Reference Watermark of the Detector," Proc. of the 2003 IEEE Int'l Symp. On Circuits and Systems, vol. 4, pp. 57-60, May, 2003.

U.S. patent publication 20020191809.

Van Schyndel et al, "Key Independent Watermark Detection," Proc. IEEE International Conference on Multimedia Computing Systems (ICMCS99).

Young-Chang et al, "An Asymmetric Watermarking Scheme Based On Visual Cryptography," Proc. 5$^{th}$ Int'l Conf. on Signal Processing, vol. 2, pp. 992-995, Aug., 2000.

The methods and arrangements detailed herein are well suited to deployment in existing content players and content security architectures. Examples include Microsoft's Windows Media Player and Windows Media Architecture & Services, Apple's iTunes and Fairplay DRM, RealNetwork's RealPlayer and Helix DRM, etc.

The technology detailed in the following patents and patent applications is well suited for incorporation into the arrangements detailed herein, and vice versa. Such arrangements are expressly contemplated:

Published patent applications 20010037313 and 20020186844;

Pending application Ser. No. 09/522,312 (now U.S. Pat. No. 6,868,497), Ser. Nos. 09/522,744, 09/620,019 (now U.S. Pat. No. 7,689,532), and Ser. No. 10/797,920 (published as 20050204037);

U.S. Pat. Nos. 6,614,914, 6,611,607;

To provide comprehensive disclosure without unduly lengthening this specification, applicant incorporates by reference the patents, patent applications, and technical articles noted above.

The invention claimed is:

1. A system that determines whether electronic content should be disqualified for rendering, the system including a processor configured by instructions in memory, said instructions configuring the system to perform actions including:
    decoding a first plural-bit digital watermark payload from the content, and determining that the first payload is consistent with reference data associated with an authorized consumer of the content;
    decoding a second plural-bit digital watermark payload from the content; and
    disqualifying the content for rendering, based on said decoding of the second plural-bit digital watermark payload from the content;
    wherein said disqualifying occurs without regard to the payload of the second digital watermark, provided it is different than the payload of the first digital watermark.

2. The system of claim 1 in which the second plural-bit digital watermark has an energy less than that of the first plural-bit digital-bit watermark.

3. The system of claim 1 in which the second plural-bit digital watermark has an energy less than 0.01 times that of the first plural-bit digital-bit watermark.

4. The system of claim 1 in which the content is disqualified for rendering by a consumer's rendering device alone, without reference to a remote data source.

5. A non-transitory computer readable medium containing instructions for causing a processor-controlled system configured thereby to perform actions including:
    decoding a first plural-bit digital watermark payload from electronic content, and determining that the first payload is consistent with reference data associated with an authorized consumer of the content;
    decoding a second plural-bit digital watermark payload from the content; and
    disqualifying the content for rendering, based on said decoding of the second plural-bit digital watermark payload from the content;
    wherein said disqualifying occurs without regard to the payload of the second digital watermark, provided it is different than the payload of the first digital watermark.

6. The medium of claim 5 in which the second plural-bit digital watermark has an energy less than that of the first plural-bit digital-bit watermark.

7. The medium of claim 5 in which the second plural-bit digital watermark has an energy less than 0.01 times that of the first plural-bit digital-bit watermark.

8. The medium of claim 5 in which the content is disqualified for rendering by a consumer's rendering device alone, without reference to a remote data source.

9. A computer readable medium containing entertainment content data that has been encoded with first and second steganographic signals, a ratio of energy between the two steganographic signals being 100:1, or greater, at least one of said steganographic signals serving to impart a control functionality when employed in a device capable of acting on said signal.

10. The medium of claim 9 in which at least one of said steganographic signals acts to disable playback of the entertainment content data by said device.

11. The medium of claim 9 in which at least one of said steganographic signals is encoded in said entertainment content data by an asymmetric watermarking technique.

12. The medium of claim 9 in which said first and second steganographic signals collectively serve to impart a control functionality when employed in a device capable of acting on said signals.

13. The medium of claim 12 in which said first and second steganographic signals act to disable playback of the entertainment content data by said device.

\* \* \* \* \*